June 15, 1937.  J. C. RUMSEY  2,083,746
VEHICLE
Filed Oct. 28, 1935
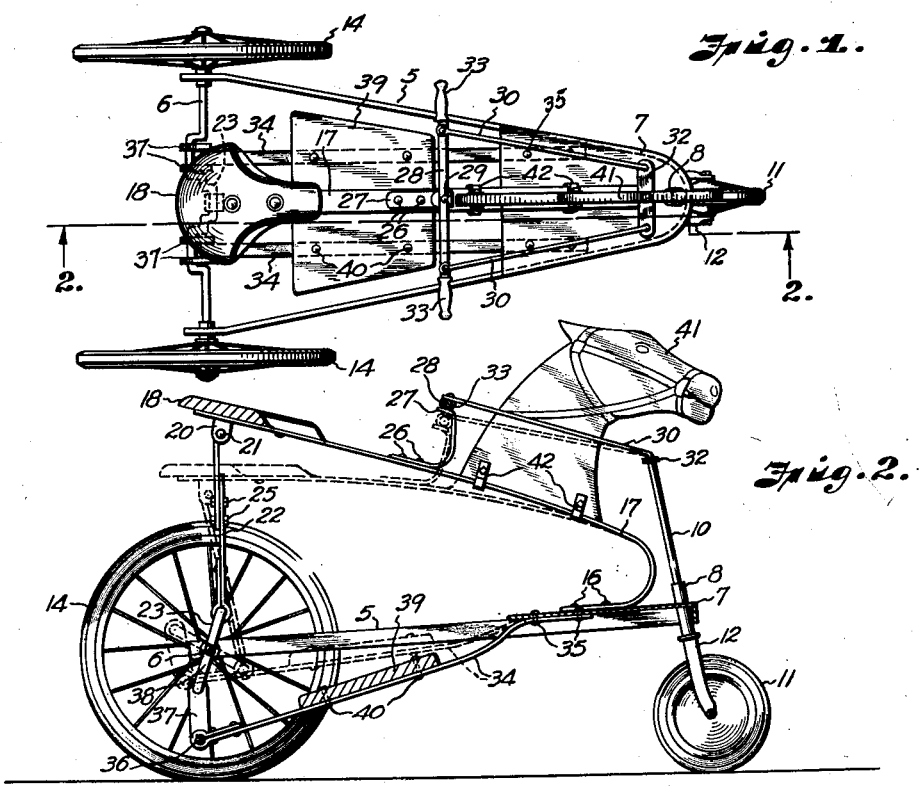
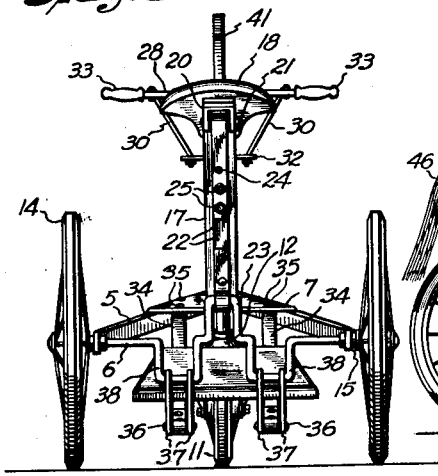
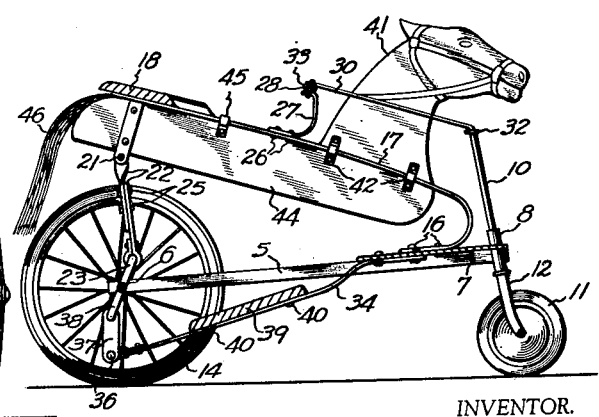
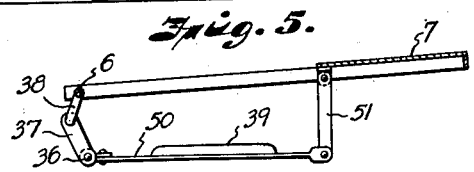
INVENTOR.
John C. Rumsey,
BY
ATTORNEY.

Patented June 15, 1937

2,083,746

UNITED STATES PATENT OFFICE 2,083,746

VEHICLE

John C. Rumsey, Lawrence, Kans., assignor to The Rumsey Junior Vehicle Company, Lawrence, Kans., a corporation of Kansas Application October 28, 1935, Serial No. 47,104

5 Claims. (Cl. 208—42)

The present invention relates to vehicles, particularly of the class used by juveniles, and aims to provide a novel and improved vehicle construction of the self-propelled type.

A primary object of the invention therefore is to devise a vehicle of this class in which the motions of the body of the rider may be utilized in cooperation with the treadle action of his feet for propelling the vehicle. In carrying out this object both the seat of the rider and a tread member provided for his feet are equipped with operating connections to the axle of the vehicle for propelling purposes.

Incidentally, the object of the invention is in a measure to devise improvements in the invention covered by Patent #2,018,381 issued to me October 22, 1935, in that the rider in his operation of propelling the vehicle simulates the movements of a jockey riding a horse or pony, and in this connection the present invention provides a figure representing the head and more or less of the body of the animal, supported by a part of the propelling structure and partaking of its movement, thus simulating the characteristic movements of such animal as it is ridden by a jockey.

It is further sought to provide an improved construction of this character which will be comparatively simple in its design and economical to manufacture, with a minimum of complications to get out of order.

With the foregoing general objects in view, the invention will now be described with reference to the accompanying drawing showing suitable forms of embodiment of my proposed improvements, after which those features and combinations deemed to be novel and patentable will be particularly set forth and claimed.

In the drawing—

Figure 1 is a plan view of a vehicle structure constructed in accordance with the present invention;

Figure 2 is a vertical sectional elevation, representing a section taken on the line 2—2 of Figure 1;

Figure 3 is a rear elevation;

Figure 4 is a side elevation, on a smaller scale, representing a modified form of construction; and Figure 5 is a detail view showing a slight modification of the tread-drive connection.

Referring now to the drawing in detail, the improved construction as illustrated as comprising a chassis frame of approximately V-form provided with bearings at its rear end for the propelling axle 6, and a plate or platform 7 at its front end, where a suitable bearing 8 is provided for a steering post 10, as clearly shown in Figures 1 and 2. A front or steering wheel 11 is mounted in a fork 12 at the lower end of said post 10, and a pair of rear wheels 14 are mounted on the ends of the axle 6, and either or both of said wheels 14 secured to the axle, though I find it practicable to key but one of them to the axle (as indicated at 15—Figure 3), leaving the other one free for the better execution of turning movements of the wheels.

To the upper face of the plate or platform 7 is secured, as by rivets 16, one end of a supporting spring 17 of appropriate size and strength, and suitably bowed at its front end and then extended upwardly and rearwardly and equipped with a seat or saddle member 18 at its rear end in position overlying the axle 6. This rear end of the spring 17 is also provided with operating connections to the axle, consisting of a clip 20 secured to the spring and carrying a pin 21 for pivotal connection with one of a pair of links 22 serving as a connecting rod to the middle crank portion 23 of the axle 6. The links 22 are formed with a series of bolt openings 24 for the connecting bolts 25 as in my aforesaid patent. This construction enables the links of the connecting rod to be adjusted, as may be needed to vary the tension of the spring 17 and also accommodate the height of the rider using the vehicle.

To the intermediate portion of the spring 17 is also secured, as by rivets 26, an upwardly extending spring element 27 for yieldingly supporting a steering arm 28 having a pivotal connection 29 to said spring 27, and also connected by operating links 30 to the end of a steering plate 32 rigidly secured to the upper end of the post 10. The ends of the arm 28 are provided with suitable hand grips 33. The spring character of the support 27 permits such yielding action as may be required by the movements of the main supporting spring 17, as represented by the dotted lines in Figure 2.

For cooperating with the action of the propelling structure already described, I also provide a pair of springs 34, of appropriate size and strength, secured at their front ends by rivets 35 to the under face of the plate 7 and pivotally connected at their rear ends by suitable pivot pins 36 and operating links 37 to a pair of crank portions 38 on the axle 6, provided at opposite sides of the crank 23 and extending in opposite relation to the latter. Preferably the arrangement of the springs 17 and 34 and their connections to the axle is such that, with the rider's weight off the seat 18, the relative position of the crank portions of the axle will be that represented by the full lines in Figure 2, that is, with the crank 23 forward of center, whereupon the initial propelling action produced by the weight of the rider imposed upon the seat will be in a forward direction. Upon the intermediate portions of the springs 34 is mounted a tread plate 39 secured to the springs by bolts or rivets 40.

Upon the forward portion of the supporting spring 17, I also mount a figure 41 representing the head portion of an animal, such as a horse or pony, secured by suitable brackets 42 to the spring and projecting upward through the space between the links 30 and forward over the post 10 and steering wheel 11.

In Figure 4 is illustrated a modification providing for a more extended simulation of the animal figure by means of an elongated part 44 representing its body, secured to the under side of the spring 17 by means of the brackets 42 as well as by additional clips or fastenings 45, and carrying at the rear end of said part 44, back of the seat 18, an appendage 46 representing the animal's tail.

In Figure 5 a slight modification of the tread-drive arrangement is shown, substituting for each of the spring members 34 a set of link connections comprising a supporting bar or plate 50 for the tread 39, and a pivotal supporting link 51 for front end of said plate 50 and connecting with platform or plate 7. This provides for a possibly freer motion of the foot and tread member in the tread action without obliging the rider to overcome any spring action, and with somewhat greater comfort to the rider since the feet are allowed to remain in a more nearly horizontal position.

Thus it will be apparent that the described construction provides a vehicle enabling the rider to not only execute the necessary steering movements, but also provide the proper propelling action both by movements of his body in simulation of a jockey, and also by the use of his feet, in treadle fashion, to drive the cranks 38 in an obvious manner. For, the weight of the rider in depressing the spring 17, as indicated by the dotted lines in Figure 2, actuates the crank 23, during which movements the rider of course relieves the tread plate of any pressure so far as possible, while the springs 34 and cranks 38 are being raised; thereafter, he of course throws all his weight upon said tread plate leaving the seat 18 free of any pressure, so that said weight, together with the combined action of the springs, serves to actuate the cranks through the remainder of their revolution, back to initial position. During this operation the animal's figure, being supported by the spring 17 and partaking of its movement, will simulate the characteristic movements of such animal, during the travel of the vehicle. Going down a hill or coasting, the propelling action may be carried out without much effort on the part of the rider, and it will also be obvious that he may so shift and apply his weight as to exert whatever braking action may be required from time to time.

It will therefore be seen that I have devised a practical and efficient vehicle construction for embodying the various proposed features of the improvement, and that the same is calculated to provide both a useful and diverting medium for juvenile purposes. While I have herein shown and described what I now regard as the preferred type of construction for carrying out my invention, I desire to be understood as reserving the right to make whatever changes or modifications may be found to fall within the scope of the appended claims.

What I claim is:

1. A vehicle of the character described comprising a frame provided with a propelling wheel, a supporting spring carrying a seat and provided with an operative driving connection to said propelling wheel, one or more counteracting springs carried by said frame in position for tread-action by the rider, and means connecting said counteracting springs for cooperative driving action to said propelling wheel.

2. A vehicle of the character described comprising a frame provided with a propelling wheel, a supporting spring carrying a seat and provided with an operative driving connection to said propelling wheel, a pair of counteracting springs secured to said frame and connected by a tread member for engagement by the feet of the rider, and means connecting said counteracting springs for cooperative driving action to said propelling wheel.

3. A vehicle of the character described comprising a frame provided with a propelling wheel, an axle provided with oppositely arranged crank portions, a supporting spring carrying a seat and provided with drive connections to one of said crank portions, and one or more counteracting springs provided with tread means and having cooperative drive connections to the other crank portions of said axle.

4. A vehicle of the character described comprising a frame provided with a propelling wheel, an axle provided with oppositely arranged crank portions, a supporting spring carrying a seat and provided with drive connections to one of said crank portions, and a pair of counteracting springs connected by a tread member for engagement by the feet of the rider and having cooperative drive connections to the other crank portions of said axle.

5. A vehicle of the character described comprising a frame provided with propelling and steering wheels, a supporting spring carrying a seat and provided with an operative drive connection to said propelling wheel, foot-operated means also provided with cooperative drive connections to said propelling wheel, and steering means for said steering wheel provided with yielding supporting means carried by said supporting spring.

JOHN C. RUMSEY.